United States Patent Office 3,781,260
Patented Dec. 25, 1973

3,781,260
PROCESS FOR METALATION
Adel F. Halasa, Bath, Ohio, assignor to The Firestone Tire & Rubber Company, Akron, Ohio
Continuation of abandoned application Ser. No. 44,468, June 8, 1970, which is a continuation-in-part of application Ser. No. 712,946, Mar. 14, 1968. This application Oct. 21, 1971, Ser. No. 191,098
Int. Cl. C08d 5/02
U.S. Cl. 260—94.7 A        16 Claims

ABSTRACT OF THE DISCLOSURE

A polymer (either a dead polymer or a lithiated live polymer) which contains a plurality of olefinic and/or aryl groups is metalated by reacting with (a) a hydrocarbon lithium and (b) a compound of an alkali metal other than lithium in which the metal is attached to a hetero atom, such as a hydroxide, alkoxide, a thiosalt or an amide. The resulting metalated polymer can be reacted to introduce reactive groups of different types, such as carboxyl, hydroxyl, etc. along the chain. For example, polybutadiene can be reacted with n-butyllithium and sodium or potassium alkoxide, and the resulting product can then be reacted with styrene or carbon dioxide, etc. and then neutralized to produce a polybutadiene containing styryl or carboxyl, etc. groups.

---

Figure 1:
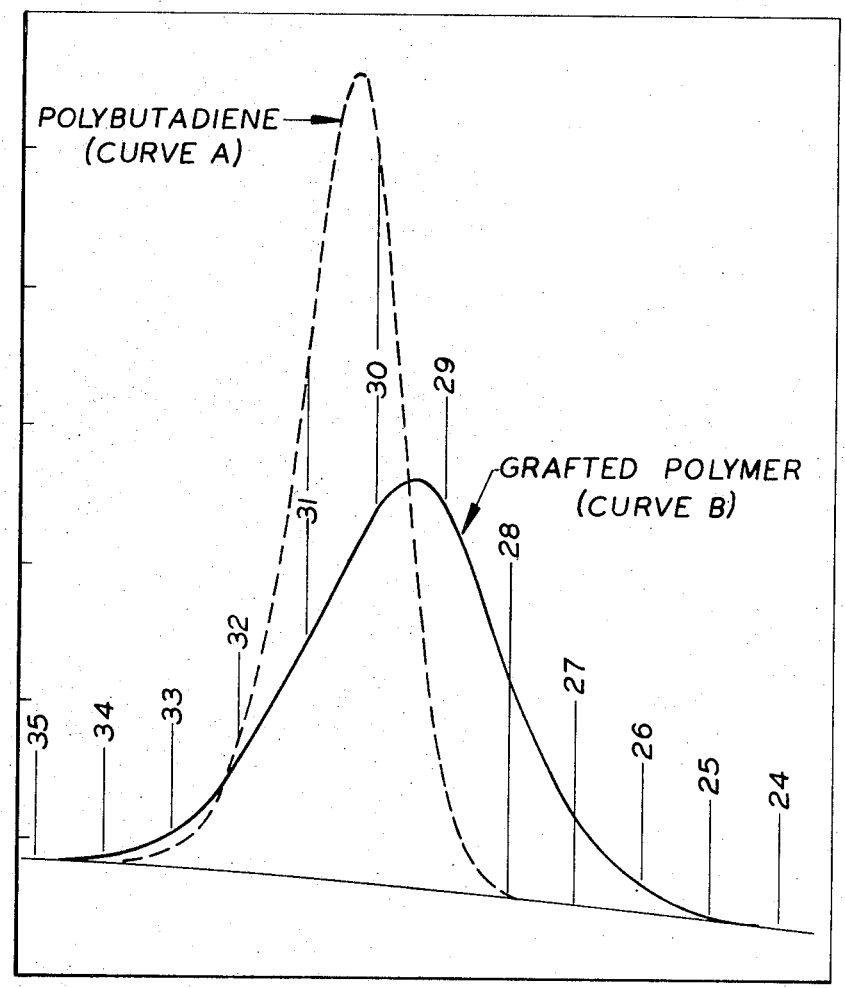

This application is a continuation of my application Ser. No. 44,468, filed June 8, 1970 which is a continuation-in-part of my application Ser. No. 712,946, filed Mar. 14, 1968.

This invention relates to the metalation of unsaturated polymers. More particularly it relates to the polymetalation of unsaturated hydrocarbon polymers which may have been lithiated as a product of the polymerization process. (The term "unsaturated" is used herein to include aromatic as well as aliphatic unsaturation between adjacent carbon atoms.) The polymers are usually rubbery. They are usually soluble in a non-aromatic hydrocarbon solvent. They contain a plurality of olefinic and/or aromatic groups. The invention includes the metalated polymers. The invention includes the metalation of dead polymers.

The active lithium in living polymers normally prepared by use of lithium initiators is located at only one end or at both ends of the polymer chain or branches thereof. The active metal atoms of the metalated products of this invention are distributed along the chain in any required amount, depending upon the amount of unsaturation and the amount of metalation desired. These atoms are usually of the same alkali metal, but may be atoms of two or more different alkali metals.

The metalated products of this invention are not intended primarily for use as polymerization initiators, although they can be so used where graft polymerization is desired. More generally the metal atoms will eventually be replaced by carboxyl, hydroxyl, amino, halogen, alkyl, acyl, allyl, benzyl, benzoyl, benzhydryl, hydroxymethyl, beta-hydroxyethyl, substituted hydroxymethyl, or substituted silyl, styryl, butadienyl, isopropyl or alpha-olefin groups or grafted side chains by procedures which simulate known procedures. See, for instance, chapter 6 (pp. 258–304) of vol. 8 of Organic Reactions, published by John Wiley and Sons, Inc. of New York, N.Y. However, introduction of such groups along the chain was not obvious without knowledge of how to metalate along the chain. Such reaction products which contain no metal group are valuable as elastomers, for extrusion, molding, etc. to replace rubbers, etc. For instance, by carboxylation of a polybutadiene, its unsaturation is decreased or eliminated and it is less susceptible to oxidation and resists discoloration and embrittlement on aging. Such a flexible product makes a good rug backing in which the degree of adhesion is controlled by the extent of the carboxylation. The carboxylated and other rubbers derived from the various polymers are curable and set on curing with sulfur. Polyesters are derived by reaction of the carboxylated polymers with glycols and form resins useful in the manner in which other polyesters are used. On reaction with diisocyanates, these polyesters form polyurethanes which have varied and useful properties depending upon their carboxylate content, etc.

The metalated polymers are soluble in non-aromatic hydrocarbon solvents, e.g., hexane, octane, methylcyclohexane and the like. (The term "soluble" herein is used in a general sense to include highly swollen or colloidally dispersed suspensions.)

The polymers which may be metalated according to the process of this invention are polymers derived at least in a substantial part from vinylidene monomers and include polybutadienes, polyisoprenes, polystyrenes, butadiene-styrene copolymers, butadiene-isoprene copolymers, isobutylene-isoprene copolymers (the copolymer commonly called butyl rubber and the like), unsaturated ethylene-propylene terpolymers (the copolymer commonly called EPT or EPDM rubber and the like); homologous polymers derived from homologs of butadiene, styrene, etc., such as dimethyl butadiene, the methyl styrenes, and the like; rubbery polymers derived from chloroprene and its congeners and the nitrile derivatives of butadiene, isoprene; etc. These polymers may be dimers, trimers or high polymers, including rubbers more particularly. The molecular distribution may be broad or narrow, the polymers may be linear or branched, and they may be prepared by any of the variety of catalysts known to the art. The invention relates more particularly to the metalation of the stereo-rubbers often referred to as solution polymers because of the usual preparation of such polymers in an organic solvent giving a product which is free from emulsifiers or other hydrophilic impurities that interfere with the metalation reaction.

The metalation reaction is carried out by means of a complex formed by the combination of (1) any one or more of the lithium compounds used for lithiation of polymers with (2) one or more compounds of a different alkali metal which have oxygen, sulfur or nitrogen (rerferred to herein as a hetero atom) attached to the alkali metal, namely an alkoxide, thiosalt or amide of the alkali metal.

Assuming that M stands for any alkali metal other than lithium, and R, R' and R" stand for an alkyl radical of 1 to 20 carbon atoms or a mono- or poly-nuclear aryl hydrocarbon radical, all of which may be the same or different, if $RLi_x$ = a lithiated hydrocarbon resulting from polymerization
$R'OM$ = an alkoxide
$R'SM$ = a thiosalt
$R'R''NM$ and $(R')_2NM$ = mono and diamides
$y$ = an oxygen, sulfur or nitrogen atom in which R's are same or different, the equation for production of the metalating reagent would be

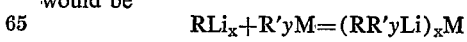
$$RLi_x + R'yM = (RR'yLi)_xM$$

it being understood that the reactions of mono- and diamides are included, R, R' and R" may be straight or branched chain or cyclic or bicyclic aliphatic or aromatic (including mono- and multi-nuclear) hydrocarbons (saturated or unsaturated) or hydrocarbon derivatives thereof. Thus $RLi_x$ can be an initiator of lithium, and includes the various lithium-derivative initiators listed in Foster U.S. Pat. 3,317,918.

Metalation of polymers containing aromatic and olefinic functional groups on carbon atoms other than terminal carbons is difficult and requires the use of high temperatures and such long reaction times that the polymers are frequently degraded. However, in the presence of compounds of an alkali metal other than lithium in which the alkali metal is attached to a hetero atom, such as hydroxides, alkoxides, sulfides and amides of sodium, potassium, cesium and rubidium, metalation proceeds rapidly and smoothly. Generally the alkali metal metalates the positions allylic to the double bonds in an unsaturated polymer. In the metalation of polymers in which there are both olefinic and aromatic groups, the metalation will occur in the position in which the metalation occurs most readily, as in positions allylic to the double bond or at a carbon to which an aromatic group is attached or in an aromatic group, or in more than one of these positions. Thus the metal atoms are positioned along the polymer chain, attached to internal carbon atoms away from the terminal carbon atoms (either along the backbone of the polymer or on groups pendant therefrom, or both), depending upon the distribution of reactive or metalatable positions. This distinguishes the products of this invention from simple terminally reacted polymers which are prepared by using a lithium or polylithium initiator in polymerization. Such prior art polymers have lithium atoms located only at one or both ends of the polymer chain or branches thereof. At least one of the terminal carbons of the metalated molecules in the products of this invention is lithiated, and this is effected prior to the metalation with a metal other than lihium or during such metalation. During the metalation along the chain a lithiating compound is present regardless of whether or not the polymer has been previously lithiated.

In metalating with a lithium hydrocarbon and an alkali metal alkoxide, thiosalt or amide, metalation occurs on the carbon atom which is allylic in the unsaturated polymer chain, and if the polymer contains aromatic nuclei, metalation appears to occur on such allylic carbons and in the aromatic nucleus or nuclei. The process is applicable to unsaturated live polymers containing lithium terminal groups as well as unsaturated polymers which are not lithiated.

My prior application Ser. No. 606,011 (now abandoned) describes a method of lithiation which introduces lithium along the polymer chain, but is limited to lithiation. The introduction of other alkali metals along the chain has not been heretofore disclosed, and such products are claimed herein as novel products. The extent of the metalation will depend upon the amount of metalating agent used and/or the points on the chain available for metalation.

The alkali metal compounds which react with the hydrocarbon lithium during metalation along the chain include the following in which "alkali metal" is used to stand for potassium, sodium, cesium or rubidium.

Alkoxides (alkyl and aryl containing up to 18 or 20 carbon atoms):
  Alkali metal methoxides
  Alkali metal ethoxides
  Alkali metal butoxides
  Alkali metal decanoxides
  Alkali metal 2-butenoxide
  Alkali metal 3-hexenoxide
  Alkali metal phenoxides
  Alkali metal toluoxides
  Alkali metal xyloxides
  Alkali metal phenylphenoxides
  Alkali metal naphthoxides Sulfides:
  Alkali metal methyl sulfides
  Alkali metal ethyl sulfides
  Alkali metal amyl sulfides
  Alkali metal octyl sulfides
  Alkali metal nonyl sulfides
  Alkali metal dodecyl sulfides
  Alkali metal allyl sulfides
  Alkali metal cyclohexyl sulfides
  Alkali metal thiotoluols
  Alkali metal thioxylols
  Alkali metal thionaphthols Amides:
  Dimethyl amide alkali metal salts
  Dipropyl amide alkali metal salts
  Diamyl amide alkali metal salts
  Didodecyl amide alkali metal salts
  Distearyl amide alkali metal salts
  Dioleoyl amide alkali metal salts
  Diallyyl amide alkali metal salts
  Diphenyl amide alkali metal salts
  Ditolyl amide alkali metal salts
  Dixylyl amide alkali metal salts
  Dinaphthyl amide alkali metal salts
  Di(diphenyl) amide alkali metal salts
  Diphenimide amide alkali metal salts
  Piperidyl amide alkali metal salts Hydroxides:
  Alkali metal hydroxides.

The lithium compound and the alkali metal compounds are known to react with each other and the reaction product may be used instead of using the individual compounds.

By polymer metalation as disclosed herein, the minimum amount of metalation along the chain which is effective may be as low as one metal atom per polymer molecule. The maximum will be one metal for each replaceable hydrogen. This will vary with the polymer involved. Thus butyl rubber which contains a very low amount of unsaturation is capable of adding a lower percentage by weight of metal than polybutadiene which is an example of a highly unsaturated polymer. For example, in the metalation of elastomeric polybutadiene one may add only a small number of metal ions for the production of certain end products, but for other end products many more metal ions may be added, as desired.

The metalated polymers are soluble in hydrocarbon solvents. They are desirable intermediates for the production of a wide variety of useful products including rubbers and resins suitable for use in pneumatic tires, adhesives, and in other known rubber and plastic articles. Such final products are obtained by reaction of the metalated polymers with carbon dioxide, styrene, methyl methacrylate and other reactive chemicals.

The amount of metalation along the chain depends on the nature of the product desired. Thus the content of metal along the chain can range from 0.001 to 1.0 percent, based on the weight of the hydrocarbon polymer.

Generally, equimolar amounts of the lithium and alkali metal compounds (based on the carbon-bound lithium) will be employed. The mole ratio of active lithium in the RLi$_x$ to alkali metal compound can vary from 0.01 to 1.5. There is little advantage, however, in using a ratio above 1:1.

In general, it is most desirable to carry out the metalation reaction in an inert solvent such as a saturated hydrocarbon. Aromatic solvents such as benzene are metalated and may interfere with the metalation of the unsaturated polymer. Unsaturated polymers that are easily metalated, however, can be successfully metalated in benzene, since the metalated aromatic compound that may be initially formed will itself metalate the unsaturated polyymer. Solvents, such as chlorinated hydrocarbons, ketones and alcohols, should generally not be used, because they destroy the metalating compound.

The process of this invention can be carried out at temperatures ranging from −70° C. to +150° C., but preferably temperatures in the range of 0° to 100° C. will be used, the upper temperature being limited by the thermal stability of the lithium compounds. The lower temperature is limited by considerations of production rate, the rate of reaction becoming unreasonably slow at low temperatures.

The length of time necessary to complete the metalation and subsequent reactions is largely dependent upon the temperature used.

It is well known that organo-alkali-metal compounds react with a wide variety of reactive chemicals to produce new chemicals of laboratory interest. We have found that the metalated polymers produced by the process of this invention react with the same types of reactive chemicals to produce products of commercial importance. For instance:

(1) The metalated polymers can be reacted with carbon dioxide and the reaction product neutralized with mineral acid to produce a carboxylated polymer wherein the degree of carboxylation is dependent upon the amount of metalation.

(2) Polymeric glycols and polyols can be prepared by reaction of the metalated polymers with ethylene oxide. Similarly, amines can be prepared by reaction with nitriles.

(3) Since the metalated polymer is itself an alkali-metal compound capable of initiating the polymerization of dienes and certain vinylic compounds, graft copolymers or homopolymers can be prepared by adding a lithium-polymerizable monomer to the metalated polymer.

(4) Block copolymers which cannot be produced by any more usual means can be prepared conveniently by reaction of the metalated polymer with a segment of a polymer which may be the same as the metalated polymer or different therefrom and having a reactive halogen group.

(5) The metalated polymers show many of the reactions characteristic of organometal compounds such as reactions with ketones, aldehydes, esters, nitriles, silicon halides, isocyanates, carboxylic acids and salts, $CO_2$, acid chlorides, etc., and such reaction products can be made with the metalated polymers.

The following examples are illustrative.

EXAMPLE 1

Into a 28-oz. bottle containing terminally lithiated polybutadiene-1,3 that has been polymerized to a low viscosity polymer, were added various quantities of n-butyllithium and potassium tert-butoxide, as recorded in the table. The bottles were placed in a 50° C. bath for 6 hours to effect the metalation. Then the contents were treated with 1 cc. of chlorotrimethylsilane. The polymers were ashed and washed with water to remove the alkali metal salts, and the percentage of silicon present in the residue was determined as a measure of the alkali metal other than lithium that had been added to the various polymers. The results are recorded in Table I.

TABLE I

| | BuLi. mmoles | $KOC_4H_9$, mmoles | Percent ash |
|---|---|---|---|
| Run number: | | | |
| 1A | 0.3 | 0.0 | 0.010 |
| 1B | 0.4 | 0.3 | 0.049 |
| 1C | 0.4 | 0.4 | 0.039 |
| 1D | 0.4 | 0.4 | 0.032 |
| 1E | 0.5 | 0.5 | 0.024 |
| 1F | 0.6 | 0.6 | 0.077 |
| 1G | 0.7 | 0.7 | 0.055 |
| 1H | 0.8 | 0.8 | 0.063 |

These results show that the polymer has been metalated along the chain.

The same procedure was used to determine the amount of alkali metal added to the polymers in Example 2.

EXAMPLE 2

Four polymer samples were prepared by charging 500 ml. blend of hexane containing 25 percent by weight of butadiene to different bottles. To each, 0.7 mmole of n-butyllithium was added and the bottles were agitated in a 50° C. bath. The reaction mixtures were neutralized to remove the lithium from the polymer. The resulting dead polymers were treated with n-butyllithium and potassium tert-butoxide in the amounts recorded in Table II. Then the products were analyzed for alkali metal content by reaction with chlorotrimethyl silane, and the ash is recorded.

TABLE II

| Metalation. run number | BuLi. mm, | $KOC_4H_9$, mm. | Percent $(CH_3)_3SiCl$ | Ash |
|---|---|---|---|---|
| Control | 0 | | | 0.10 |
| 4A | 0.4 | | | 0.10 |
| 4B | 0.3 | 0.3 | 0.49 | 0.49 |
| 4C | 0.4 | 0.4 | 0.39 | 0.39 |

EXAMPLE 3

Four hundred milliliters of a 19-percent solution of butadiene in benzene were placed in each of four 28-oz. bottles. To each bottle was added 1.0 ml. of 1.55 mmoles of n-butyllithium. The bottles were placed in a bath held at 50° C. and agitated for 16 hours and the polymer was then neutralized. To each of the bottles which then contained dead polybutadiene polymer, there was then added 20 mmoles of a solution containing 90 percent of n-butyllithium and 10 percent of potassium tert-butoxide to serve as a catalyst. Styrene was added to the metalated polymers and the bottles were kept at 50° C. and agitated for another 2 to 3 hours. The process and stereo-analysis and styrene content of the resulting polymers are summarized in the following table. The reaction products were analyzed and found to contain the amount of styrene recorded in the following table.

TABLE III

| | Polymerization, BuLi, mmoles | Metalation, catalyst, mmoles | Styrenation, styrene, ml. | Product, percent styrene |
|---|---|---|---|---|
| Run number: | | | | |
| 3A | 1.55 | 20 | 15 | 12.7 |
| 3B | 1.55 | 20 | 15 | 16.4 |
| 3C | 1.55 | 20 | 15 | 12.7 |
| 3D | 1.55 | 20 | 15 | 17.2 |

Thus, a substantial amount of alkali metal along the chain was replaced with styrene.

EXAMPLE 4

Four hundred milliliters of a 19-percent solution of butadiene in benzene were added to each of five 28-oz. bottles. Then 1.55 millimoles of n-butyllithium was added to each bottle. The bottles were agitated for 16 hours in a 50° C. bath and the resulting polymers were neutralized. To each of the bottles which then contained dead polybutadiene, there was added a solution of 90 percent of butyllithium and 10 percent of potassium tert-butoxide as catalyst in the amounts recorded in Table IV, and the bottles were again agitated at 50° C. for 6 to 12 hours. The bottles were cooled and 5 ml. of styrene was added to each and they were again agitated at 50° C., overnight.

The table gives details of the process and the styrene content of the product.

TABLE IV

| Run number: | Polymerization, BuLi, mmoles | Metalation, catalyst, mmoles | Styrenation, styrene, ml. | Product, percent styrene |
| --- | --- | --- | --- | --- |
| 4A | 1.55 | 5 | 5 | 8.0 |
| 4B | 1.55 | 10 | 5 | 8.4 |
| 4C | 1.55 | 20 | 5 | 8.7 |
| 4D | 1.55 | 30 | 5 | 7.7 |
| 4E | 1.55 | 40 | 5 | 7.7 |

The results show that the chain of the polymer was metalated, and such metal was replaced by styrene.

EXAMPLE 5

Polybutadiene was prepared by polymerizing 165 grams of butadiene-1,3 in 525 parts of heptane at 140° F., using 0.6 part of n-butyllithium. The polymerization was completed in 6 hours.

The polymer, still in solution, was metalated by adding 700 grams of heptane, 6 mmoles of t-butyllithium and 6.6 mmoles of KOH per each 100 grams of butadiene in solution. This metalation reaction was carried out at 130° F. for 16.5 hours. Additional butadiene-1,3 was grafted on to the polylithiated polymer by adding 112 grams of butadiene and 428 grams of heptane and heating at 125° F. for 4.5 hours. Seventy percent of the polybutadiene in the final product was internally grafted, as determined by G.P.C. (gel permeation chromatograph).

Before metalation and reaction with butadiene, the polymer had a dilute solution viscosity of 2.09, and that of the final polymer was 3.05. There was no substantial change in the stereostructure of the final polymer. Both before and after treatment the polymer contained 35 to 40 percent cis-polymer, 50 to 55 percent trans-1,4-polymer and 8 to 10 percent 1,2-polymer. The molecular weight distribution as shown by the G.P.C. curves, A and B of FIG. 1, both before and after treatment (FIG. 1), is shown in the drawing. The KOH metalating agent does not cause an increase in vinyl content. Instead of replacing the lithium with butadiene, it may be replaced with styrene. The grafted polymers are satisfactory for tire manufacture.

EXAMPLE 6

The polybutadiene backbone prepared by polymerizing 1,3-butadiene (24.7% in hexane solvent) at 50° C. using n-butyllithium, BuLi (1.0 mm./100 g. polymer) was metalated with n-butyllithium and with different amounts of potassium-tert-butoxide, BuOK. The metalated polymer was grafted with freshly distilled styrene. The polymer was then coagulated and dried. Details of the procedure are given in the following table.

TABLE VI

| Sample number | 1 | 2 |
| --- | --- | --- |
| Metalation: | | |
| mMole of BuLi | 8.8 | 8.5 |
| mMole of BuOK | 8.8 | 17.0 |
| Styrene grafted, grams | 45.0 | 47.0 |
| Mol. wt. of recovered styrene block, $M_n$ | 12,500 | 11,000 |
| Calc'd mol. wt. of styrene block, $M_n$ [1] | 5,100 | 5,530 |
| mMole of active catalyst | 3.6 | 4.2 |
| Metalation temperature, ° C | 50 | 50 |
| Metalation time, hours | 4 | 4 |
| Homostyrene, percent by— | | |
| Acetone analysis | 5.8 | 12.50 |
| G.P.C | 7.6 | 14.50 |

[1] Calculation based on total metalating agent exclusive of catalyst used for base polymer.

From the foregoing table it is evident from the G.P.C. as well as the acetone extraction data that only a small amount of homostyrene is present. The metalation was complete and a high percentage (about 95%) of the metalating agent was consumed for metalation by placing alkali metal atoms on the polymer chain.

EXAMPLE 7

A stainless steel reactor was charged with a blend of 9.5 percent butadiene in hexane. The butadiene was polymerized using organolithium initiators (n-butyllithium) 1.0 mmole per 100 grams of butadiene to get a molecular weight of 100,000. The total catalyst added to the reactor was 2.70 mmole. The polymerization temperature was adjusted at 50° C. and was allowed to agitate for 8 hours. This procedure is usually followed to prepare a polybutadiene backbone of 100,000 molecular weight, a cis-1,4 content of 30 to 40 percent, a trans-1,4 content of 50 to 60 percent, and a 1,2-vinyl of 7 to 12 percent. Usually this gave 95 to 99 percent conversion of monomer to polymer.

The metalation procedure is described in connection with the polymer produced by the foregoing method but is applicable to other polymers of any stereo composition produced by the Ziegler catalysis, cationic polymerization, coordination catalyst, or free radical catalyst.

The polybutadiene cement obtained from Example 1 of the foregoing example was metalated by adding n-butyllithium and potassium tertiary amylate. The ratio of n-butyllithium to the potassium tertiary amylate depends upon the mode of metalation and the degree of metalation desired; however, a potassium-to-lithium ratio of 1/1 is generally preferred. A typical run is described as follows:

Five millimoles of n-butyllithium per 100 grams of polybutadiene and 5 millimoles of potassium tertiary amylate per 100 grams of polybutadiene were added to the polymer prepared in the above example, whether the polymer be live or dead. The ratio of n-butyllithium to potassium tertiary amylate being 1/1. This can vary from 1/1 to 1/10. The metalating agent was blended with the polymer and the temperature of the metalation was raised to 50° C. for 4 hours. After metalation was completed the resulting polymetalated rubber was grafted with styrene by adding 50 ml. of freshly distilled styrene. This gave 20 percent of styrene in the copolymer. The grafting was done at 50° C. for 1½ hours. After that the polymer was coagulated with isoproponyl containing antioxidant and the sample was dried.

Figure 2:
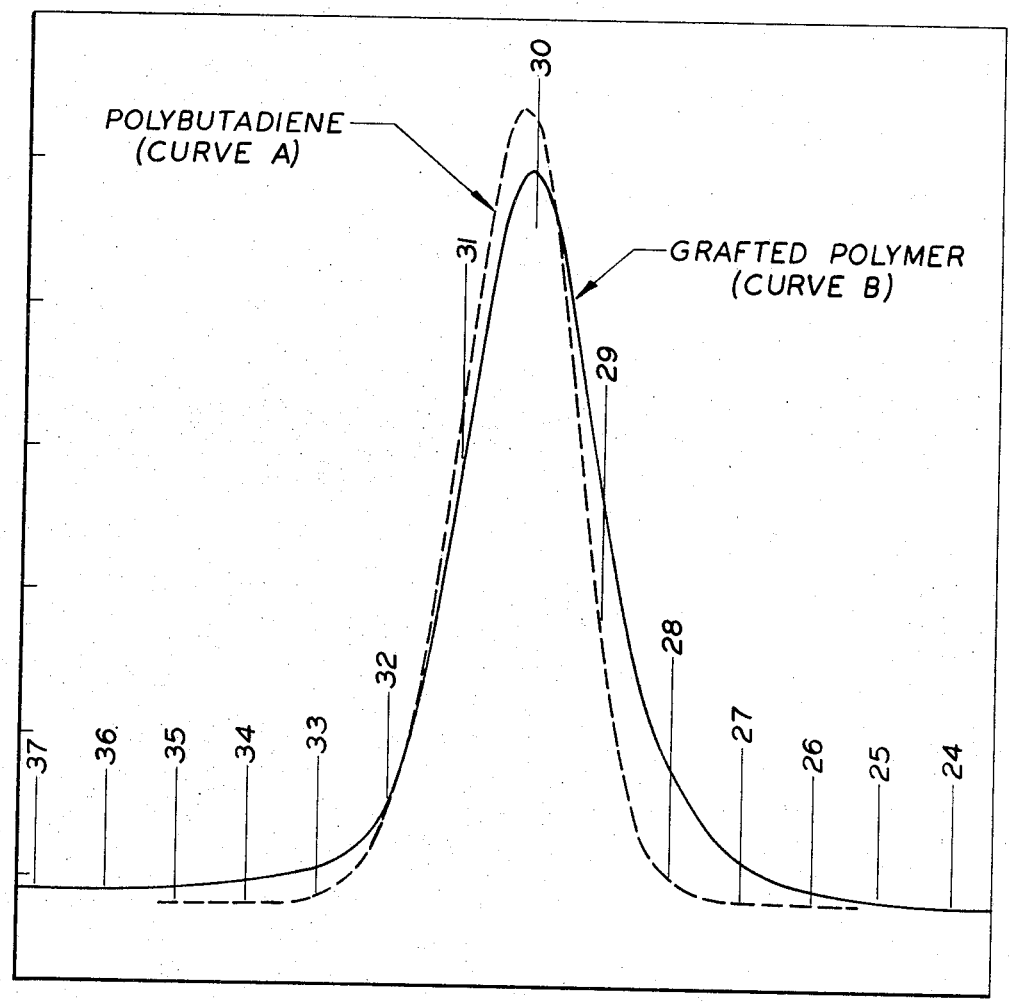

FIG. 2 shows that the gel permeation chromatograph on the control sample, before metalation (curve A), peaked at 30.2 G.P.C. count corresponds to a molecular weight of 84,000, and the gel permeation chromatograph after metalation (curve B) peaked at 29.7 G.P.C. showing a molecular weight of 90,000. The increase in molecular weight was due to the addition of styrene. However, the significant point in that the G.P.C. curve after metalation, is the absence of homostyrene at G.P.C. count of 34. This substantiates the fact that complete metalation occurred without degradation of the parent polymer. The advantage of metalation with n-butyllithium-potassium-tert-amylate is that it does not cause cleavage of the polymer chain which is experienced in the butyllithium-amine metalating system.

The grafted copolymer was also extracted with acetone. The acetone extract was analyzed for homostyrene and in many cases it was absent from the acetone extract. In other cases there was only a small amount of homostyrene present. Attention is directed to Table VI which contains the results of a number of runs, which were prepared according to the above general procedures of which Run No. 1 is illustrated in the accompanying drawing.

By varying the temperature and the time of metalation, as well as the ratio of the PTA to the butyllithium, different percentages of lithium are added to the backbone and the polymers produced contain corresponding percentages of styrene.

TABLE VII

Diene metalation using the soluble n-butyllithium/potassium t-amylate system

| Run number: | BuLi/PTA | Melting time, hrs. at °C. | mMoles C-Li/100 g. BD | Via G.P.C.,[1] percent homostyrene | Grams styrene added | mMoles act. Li |
|---|---|---|---|---|---|---|
| 1 | 1/1 | 2-30 | 5.0 | 25.8 | 10.9 | 0.72 |
| 2 | 1/1.5 | 2-30 | 5.0 | 17.2 | 10.9 | 0.72 |
| 3 | 1/0.5 | 2-50 | 5.0 | [2] 0 | 10.0 | 0.23 |
| 4 | 1/2 | 2 50 | 5.0 | 25.9 | 10.0 | 0.50 |
| 5 | 1/4 | 2-50 | 5.0 | 0 | 10.0 | |
| 6 | 1/1 | 4-50 | 5.0 | 7.6 | 45.0 | 3.6 |
| 7 | 1/2 | 4-50 | 5.0 | 14.5 | 47.0 | 4.2 |
| 8 | 1/1 | 8-30 | 5.0 | 28.1 | 46.0 | 5.5 |

[1] No correction made for possible UV absorption due to conjugation. This sometimes results in high homostyrene values.

[2] G.P.C. trace was not symmetrical, although no definite break occurred.

In the foregoing table the following abbreviations have been used:

BuLi=n-Butyllithium
PTA=Para-tert-amylate
Met.=Metalation
C-Li=Carbon-bound lithium
BD=Butadiene
G.P.C.=Gel permeation chromatograph
Sty.=Styrene
Li=Lithuim
Act.=Active.

Referring to the table, it will be seen that by lowering the temperature the percentage content of the styrene homopolymer increases, indicative of poor metalation conditions. The time of metalation and also the ratio of the butyllithium to the PTA have no more than a minor effect. Thus, if the ratio of butyllithium to PTA is in the range of 1/1 to 1/5 and the temperature is no greater than about 30° C., a high content of grafted styrene is produced.

The styrenated polymers have rubber properties and may be vulcanized and otherwise utilized as rubbers have been used in the manufacture of tires, belts, mats and an endless variety of other products.

I claim:

1. The method of lithiating along the backbone hydrocarbon polymer containing allylic or benzylic unsaturation derived at least in part from vinylidene monomer, which method comprises reacting the polymer with a soluble n-alkyllithium compound and an alkoxide, hydroxide, thiosalt or amide of an alkali metal other than lithium in an inert organic solvent at −70° to 150° C., the mole ratio of the lithium to the other alkali metal in the respective compounds being 0.01 to 1.5.

2. The method of claim 1 in which a dead polymer is used.

3. The method of claim 1 in which the polymer is a lithiated live polymer.

4. The method of claim 1 in which the polymer is polybutadiene.

5. The method of claim 1 in which the compound of an alkali metal is an alkoxide.

6. The method of claim 5 in which the compound of an alkali metal is potassium-t-butoxide.

7. The method of claim 5 in which the compound of an alkali metal is potassium-t-amylate.

8. The method of claim 1 in which the compound of an alkali metal is a potassium salt.

9. The method of claim 1 in which polybutadiene is reacted with a butyllithium and potassium hydroxide.

10. The method of lithiating along the backbone hydrocarbon polymer containing allylic or benzylic unsaturation derived at least in part from vinylidene monomer which method comprises reacting a soluble n-alkyllithium compound and an alkoxide, hydroxide, thiosalt or amide of an alkali metal other than lithium in an inert organic solvent at 0° to 100° C., the mole ratio of the lithium to the other alkali metal in the respective compounds being 0.01 to 1.5, and metalating the polymer with the reaction product.

11. The method of claim 10 in which the polymer is butadiene.

12. The method of claim 10 in which the compound of an alkali metal is an alkoxide.

13. The method of claim 10 in which the compound of an alkali metal is a potassium salt.

14. The method of claim 10 in which polybutadiene is treated in the presence of n-butyllithium and potassium t-butoxide.

15. The method of claim 10 in which polybutadiene is treated in the presence of n-butyllithium and potassium t-amylate.

16. The method of claim 10 in which polybutadiene is treated in the presence of butyllithium and potassium hydroxide.

References Cited

FOREIGN PATENTS

| 873,656 | 7/1961 | Great Britain | 260—94.2 |
| 1,478,225 | 3/1967 | France | 260—877 X |

JOSEPH L. SCHOFER, Primary Examiner

W. F. HAMROCK, Assistant Examiner

U.S. Cl. X.R.

260—80.78, 82.1, 83.3, 85.1, 85.3, 88.7 B, 92.3, 94.7 N, 93.5 A, 94.7 S

UNITED STATES PATENT OFFICE
CERTIFICATE OF CORRECTION

Patent No. 3,781,260　　　　　　　　　Dated December 25, 1973

Inventor(s) Adel F. Halasa

It is certified that error appears in the above-identified patent and that said Letters Patent are hereby corrected as shown below:

Column 1, Line 52, "amonut" should be --amount--.

Column 4, Line 19, "Diallyyl" should be --Diallyl--.

Column 4, Line 73, "polyymer" should be --polymer--.

Column 5, Line 43, "$CO_2$" should be --$SO_2$--.

Column 6, Line 23 (Table II), "Metalation." should be --Metalation:--.

Column 6, Line 23 (Table II), "mm," should be --mm.--.

Column 6, Line 23 (Table II), "Ash" should be --% Ash--.

Column 9, Line 9 (Table VII), "2 50" should be --2-50--.

Signed and sealed this 17th day of September 1974.

(SEAL)
Attest:

McCOY M. GIBSON JR.　　　　　　　　　C. MARSHALL DANN
Attesting Officer　　　　　　　　　　Commissioner of Patents